United States Patent
Boesch et al.

(10) Patent No.: US 9,664,136 B2
(45) Date of Patent: May 30, 2017

(54) AUTO-STOP CONTROL FOR A STOP/START VEHICLE NEAR WATER

(71) Applicant: Ford Global Technologies, LLC, Dearborn, MI (US)

(72) Inventors: Mathew Alan Boesch, Plymouth, MI (US); George Edmund Walley, Novi, MI (US); John Anthony Lockwood, Canton, MI (US); Sangeetha Sangameswaran, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 679 days.

(21) Appl. No.: 13/793,570

(22) Filed: Mar. 11, 2013

(65) Prior Publication Data

US 2014/0257678 A1 Sep. 11, 2014

(51) Int. Cl.
*B60W 30/00* (2006.01)
*F02D 45/00* (2006.01)
*F02N 11/08* (2006.01)

(52) U.S. Cl.
CPC .......... *F02D 45/00* (2013.01); *F02N 11/0837* (2013.01); *F02N 2200/0801* (2013.01); *F02N 2200/123* (2013.01); *F02N 2200/124* (2013.01); *Y02T 10/48* (2013.01)

(58) Field of Classification Search
CPC .. G07C 5/00; B60G 17/0195; B60G 17/0165; B60W 30/18009; B60W 10/06; B60W 30/18018; B60W 40/06; B60W 2422/95; B60W 2550/14; F02N 11/0837; Y02T 10/48

USPC .................... 123/179.3, 179.4; 701/107, 112
See application file for complete search history.

(56) References Cited

U.S. PATENT DOCUMENTS

| | | | |
|---|---|---|---|
| 4,747,064 A | 5/1988 | Johnston | |
| 5,629,689 A | 5/1997 | Curwood | |
| 5,745,581 A | 4/1998 | Eatwell et al. | |
| 6,675,094 B2 | 1/2004 | Russell et al. | |
| 6,856,919 B1 | 2/2005 | Bastian et al. | |
| 6,900,740 B2 | 5/2005 | Bloomquist et al. | |
| 6,941,218 B2 * | 9/2005 | Wolf et al. | 701/112 |
| 7,349,797 B2 * | 3/2008 | Donnelly et al. | 701/115 |
| 7,650,864 B2 * | 1/2010 | Hassan et al. | 123/179.2 |

(Continued)

FOREIGN PATENT DOCUMENTS

| | | | |
|---|---|---|---|
| DE | 3019709 A1 | 6/1980 | |
| JP | 2000257459 A1 * | 9/2000 | F02D 29/02 |

(Continued)

OTHER PUBLICATIONS

BoatUS, Foundation, Online Boating Safety Study Guide, Copyrighted 2008, p. 19.*

(Continued)

*Primary Examiner* — Hieu T Vo
*Assistant Examiner* — Arnold Castro
(74) *Attorney, Agent, or Firm* — David B. Kelley; Brooks Kushman P.C.

(57) ABSTRACT

A stop/start vehicle includes an engine and a stop/start system that prevents an auto stop of the engine when a speed of the vehicle is approximately zero in response to the vehicle being located within a specified distance from a body of water or in response to the vehicle being located in a user identified geographic region.

8 Claims, 2 Drawing Sheets

(56) References Cited

U.S. PATENT DOCUMENTS

| | | | |
|---|---|---|---|
| 7,681,546 B2 | 3/2010 | Lecole et al. | |
| 8,095,291 B2 | 1/2012 | Christen et al. | |
| 8,392,066 B2 | 3/2013 | Ehara et al. | |
| 8,498,802 B2 | 7/2013 | Yamamoto | |
| 8,532,843 B2* | 9/2013 | Nagura et al. | 701/2 |
| 8,594,912 B2* | 11/2013 | Weaver | 701/112 |
| 8,904,984 B2* | 12/2014 | Hanft et al. | 123/179.4 |
| 2004/0233045 A1 | 11/2004 | Mays | |
| 2005/0239436 A1 | 10/2005 | Bell et al. | |
| 2006/0277495 A1* | 12/2006 | Obradovich | 715/790 |
| 2008/0266052 A1 | 10/2008 | Schmid | |
| 2009/0171547 A1 | 7/2009 | Hyde et al. | |
| 2010/0070128 A1 | 3/2010 | Johnson | |
| 2010/0125402 A1 | 5/2010 | Bansal et al. | |
| 2010/0152963 A1 | 6/2010 | Heckel et al. | |
| 2010/0168992 A1* | 7/2010 | Nakata | 701/112 |
| 2011/0005486 A1* | 1/2011 | Nakamura | 123/179.4 |
| 2011/0256981 A1 | 10/2011 | Saito et al. | |
| 2011/0288743 A1 | 11/2011 | Smith | |
| 2012/0010797 A1 | 1/2012 | Luo et al. | |
| 2013/0035839 A1* | 2/2013 | Otanez et al. | 701/102 |
| 2014/0005914 A1 | 1/2014 | Bernzen | |
| 2014/0081561 A1* | 3/2014 | Be et al. | 701/112 |
| 2014/0136041 A1 | 5/2014 | Malone et al. | |
| 2014/0257679 A1* | 9/2014 | Boesch et al. | 701/112 |
| 2014/0343830 A1 | 11/2014 | Elwart et al. | |
| 2015/0046032 A1* | 2/2015 | Clarke | B60G 17/0165 701/37 |

FOREIGN PATENT DOCUMENTS

| | | |
|---|---|---|
| JP | 2004232557 A2 | 8/2004 |
| JP | 2006057456 A2 | 3/2006 |

OTHER PUBLICATIONS

Office Action mailed Dec. 30, 2014, U.S. Appl. No. 14/053,722, filed Oct. 15, 2013.

Final Office Action dated Sep. 4, 2015 in U.S. Appl. No. 14/053,637, filed Oct. 15, 2013.

Non-Final Office Action dated May 22, 2015, U.S. Appl. No. 14/053,637.

\* cited by examiner

AUTO-STOP CONTROL FOR A STOP/START VEHICLE NEAR WATER

TECHNICAL FIELD

This disclosure relates to stop/start vehicles and controlling stop/start activities while the vehicle is situated on a boat ramp.

BACKGROUND

Stop/start vehicles may be equipped with an engine auto-stop feature. This feature shuts down the engine during certain periods of vehicle operation in order to conserve fuel. For example, the auto-stop feature may be engaged when the vehicle is stopped rather than permitting the engine to idle. The engine may be restarted when the driver releases the brake or actuates the accelerator.

SUMMARY

A stop/start vehicle includes an engine and a stop/start system that prevents an auto stop of the engine when the speed of the vehicle is approximately zero in response to the vehicle being located within a specified distance from a body of water. The specified distance may be the length of the vehicle. The stop/start system may further prevent an auto stop of the engine if a trailer is connected to the vehicle. The stop/start system may further prevent an auto stop of the engine in response to a drive surface gradient under the vehicle exceeding a threshold value. The specified distance may be a user-selectable distance.

A stop/start vehicle may be controlled to prevent an auto stop of an engine when a speed of the vehicle is approximately zero in response to the vehicle being located within a user identified geographic region. The user identified geographic region may include a boat ramp. The step of preventing may be performed if a trailer is connected to the vehicle. The step of preventing may be performed if a drive surface gradient under the vehicle exceeds a threshold value.

A stop/start vehicle includes an engine and a stop/start system that prevents an auto stop of the engine when a speed of the vehicle is approximately zero in response to the vehicle being located within a user identified geographic region if a trailer is attached to the vehicle. The user identified geographic region may include a boat ramp. The stop/start system may further prevent an auto stop of the engine if a drive surface gradient under the vehicle exceeds a threshold value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with a stop/start system controlling auto-stop and auto-start functions. The stop/start system may auto-stop the engine when the vehicle is stopped and the engine is not required for propulsion or other purposes. At a later time, the stop/start system may auto-start the engine when required for propulsion or other purposes. By disabling the engine when possible, overall fuel consumption is reduced. Unlike true hybrid vehicles, stop/start vehicles are not capable of pure electric propulsion. Furthermore unlike true hybrid vehicles, stop/start vehicles are not equipped with a traction battery. Rather they merely include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
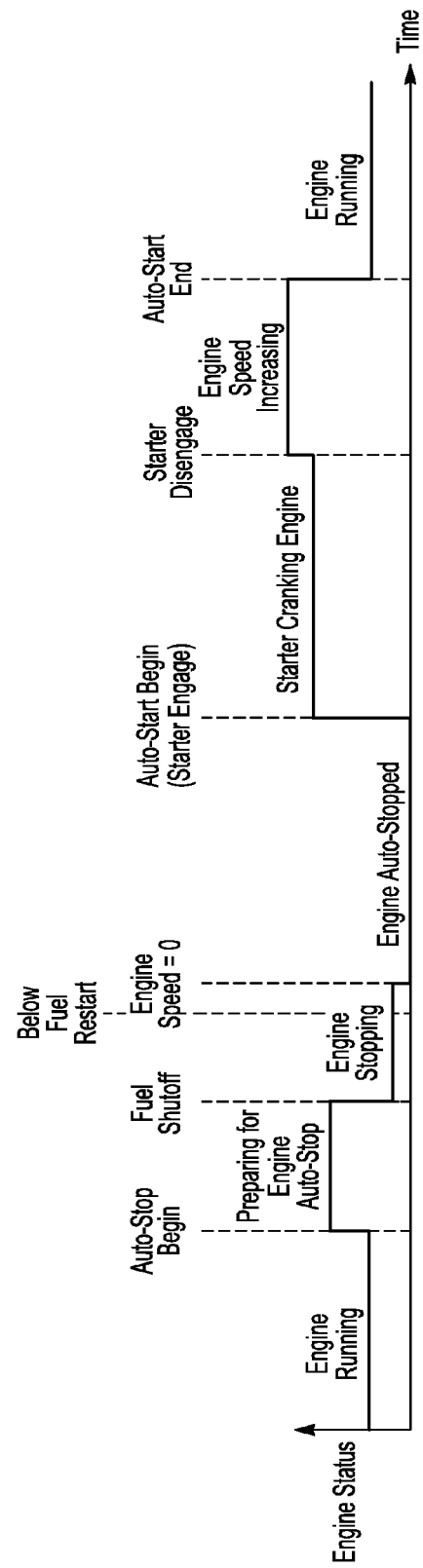
FIG. 1 is a plot illustrating engine status during an auto-stop.

With reference to FIG. 1, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

In stop/start vehicles, the stop/start system may automatically shut down the engine in order to save fuel, and at a later time automatically restart the engine. However, in certain situations it is undesirable for the engine to automatically stop. For example, when the tail pipe of the exhaust system is submerged in water, as may occur when the vehicle is launching a boat from a boat ramp, automatically stopping the engine may allow water to backflow into the tail pipe.

Certain systems and methods disclosed herein may provide an improved stop/start control configuration for an engine having auto-stop functionality. A controller may utilize inputs from a variety of sensors to determine, for example, whether the vehicle is located on a boat ramp. If a determination is made that the vehicle is on a boat ramp, the controller may prevent the engine from automatically shutting down.

Figure 2:
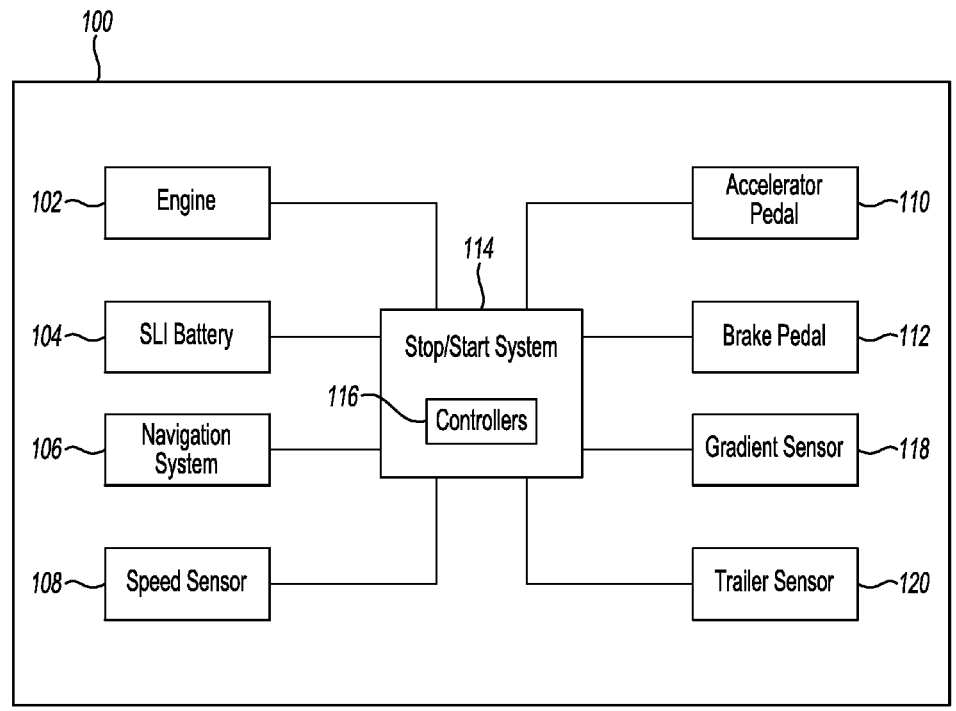
FIG. 2 is a block diagram of a stop/start vehicle.

With reference to FIG. 2, a schematic representation of a vehicle 100 having auto-stop functionality is shown. The vehicle 100 includes an engine 102, an SLI battery 104, a navigation system 106, a speed sensor 108, an accelerator pedal 110, and a brake pedal 112. The vehicle further includes a stop/start system 114 including at least one controller 116, a gradient sensor 118, and a trailer sensor 120 (e.g., an optical sensor arranged to detect the presence of a trailer attached to the vehicle 100, etc.) The engine 102, SLI battery 104, navigation system 106, speed sensor 108, accelerator pedal 110, brake pedal 112, gradient sensor 118 and trailer sensor 120 are all in communication with or under the control of the stop/start system 114, as indicated by thin solid line. In one configuration, the navigation system 106 may be an in-vehicle GPS system. In another configuration, the navigation system 106 may comprise a location-enabled mobile device such as a cellular phone or standalone GPS unit. Other configurations are, of course, also possible.

The at least one controller 116 may issue auto-stop commands and auto-start commands to the engine 102 during vehicle operation. The stop/start system 114, for example, comprises a base auto-stop/start logic that issues auto-stop commands and auto-start commands—to achieve, among other things, stages similar to that described with reference to FIG. 1—based on signals from at least the speed sensor 108, accelerator pedal 110, and brake pedal 112. In short, the engine 102 will be shut down in response to an auto-stop command and will be restarted in response to an auto-start command.

Figure 3:
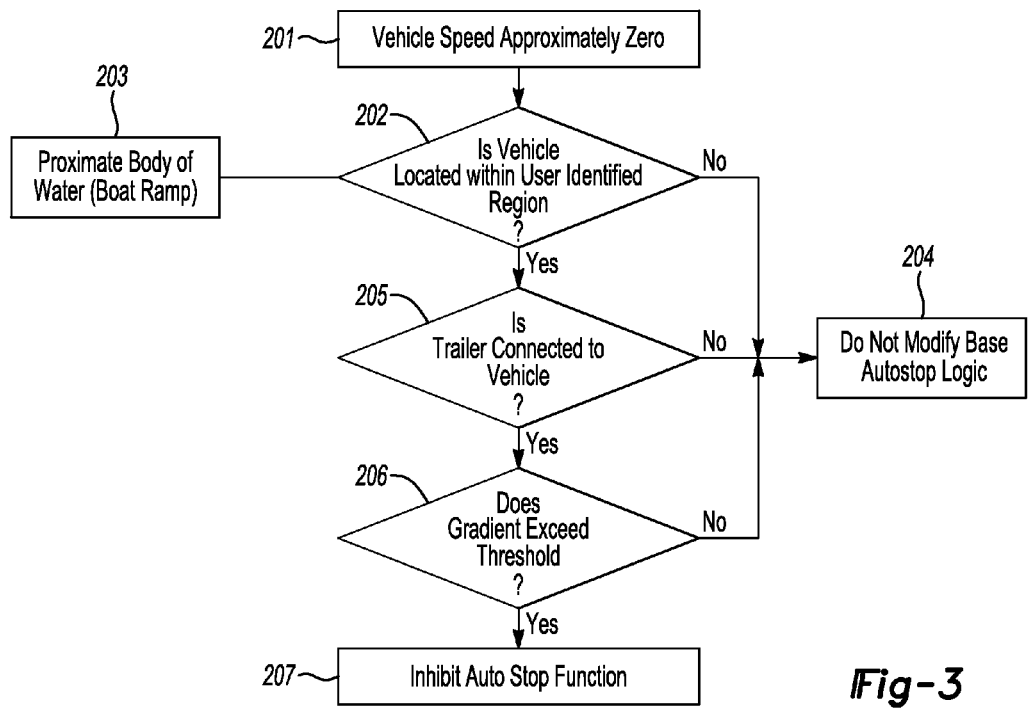
FIG. 3 is a flowchart illustrating an algorithm for controlling a start/stop vehicle.

In one embodiment described with reference to FIGS. 2 and 3, the vehicle 100 comes to a stop, as illustrated in block 201. It is also determined whether the vehicle 100 is located within a user-identified geographic region at block 202. This geographic region may be proximate a body of water, such as a boat ramp as illustrated by block 203. The user-identified geographic region may be input, for example, by way of the navigation system 106 or other suitable driver interface, and stored as coordinates in space, a geo-fence boundary, or other manners as appropriate. Determining that the vehicle 100 is located within a user-identified geographic region may be performed by detecting a current vehicle location using the navigation system 106, and comparing the current vehicle location with a stored list of user-identified regions. If no, the base auto-stop logic is left unmodified at block 204. That is, the stop/start system 114 will control engine auto stops and auto starts based on vehicle speed and other relevant parameters following the processes described with reference to FIG. 1.

Returning to block 202, if yes, it is optionally determined whether a trailer is connected to the vehicle 100 at block 205. This determination may be performed in conjunction with embodiments of the system that include the trailer sensor 120. If no, the base auto-stop logic is left unmodified at block 204.

Returning to block 205, if yes, it is optionally determined whether the driving surface gradient under the vehicle 100 exceeds a specified threshold. Determining that the driving surface gradient exceeds a specified threshold may comprise receiving a signal from a gradient sensor 118, such as a tilt sensor or accelerometer, indicating a current gradient. In an alternative configuration, the driving surface gradient may be determined using the current vehicle location as detected by the navigation system 106 and looking up a gradient using stored topographic data. If no, the base auto-stop logic is left unmodified at block 204. If yes, the auto-stop function is prevented as illustrated by block 207. That is, the engine 102 remains running.

In one example, a vehicle equipped with a stop/start system and towing a trailer approaches a boat ramp. The driver interacts with a navigation system and requests that the engine not auto-stop while near the present location. The effective area could default to a fixed radius from the current location or could toggle through a sequence of radii. This information is stored as a set of coordinates or as a geo-fence. Subsequently, one or more controllers detect vehicle location and compare it with a stored list of user-identified locations. If the detected location falls within one of the user-identified locations, the controllers may verify that the trailer is attached with the vehicle and that a drive surface gradient underneath the vehicle exceeds a threshold. Upon completing this protocol, the controllers may inhibit any attempts to auto-stop the engine when vehicle speed is approximately zero.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As an example, one or both of blocks 205 and 206 may be omitted. In such embodiments, the auto-stop function may be prevented based only on a determination that the vehicle is located within a user-defined geographic region.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a stop/start vehicle comprising:
receiving input defining a user-identified geographic region remote from a current location of the vehicle; and
preventing an auto stop of an engine when a speed of the vehicle is approximately zero in response to the vehicle being located within the user-identified geographic region.

2. The method of claim 1 wherein the user-identified geographic region includes a boat ramp.

3. The method of claim 1 wherein the preventing is only performed if a trailer is connected to the vehicle.

4. The method of claim 1 wherein the preventing is only performed if a drive-surface gradient under the vehicle exceeds a threshold value.

5. The method of claim 1, wherein the vehicle being located within the user-identified geographic region is based on a comparison of a detected vehicle location against a user-identified geo-fence.

6. A stop/start vehicle comprising:
an engine; and
a stop/start system programmed to receive input defining a user-identified geographic region remote from a current location of the vehicle, and to prevent an auto stop of the engine when a speed of the vehicle is approximately zero in response to the vehicle being located within the user-identified geographic region and a trailer being attached to the vehicle.

7. The vehicle of claim 6 wherein the user-identified geographic region includes a boat ramp.

8. The vehicle of claim 6 wherein the stop/start system is further programmed to prevent an auto stop of the engine if a drive-surface gradient under the vehicle exceeds a threshold value.

* * * * *